(12) United States Patent
Blackwell

(10) Patent No.: US 10,272,341 B1
(45) Date of Patent: Apr. 30, 2019

(54) PROCEDURAL LEVEL GENERATION FOR GAMES

(71) Applicant: Amazon Technologies, Inc., Seattle, WA (US)

(72) Inventor: Christopher Blackwell, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 15/385,487

(22) Filed: Dec. 20, 2016

(51) Int. Cl.
 *A63F 13/67* (2014.01)
 *A63F 13/46* (2014.01)

(52) U.S. Cl.
 CPC .............. *A63F 13/67* (2014.09); *A63F 13/46* (2014.09)

(58) Field of Classification Search
 USPC ........................................................ 463/31
 See application file for complete search history.

(56) References Cited

U.S. PATENT DOCUMENTS

| 7,846,024 B2* | 12/2010 | Graepel | G07F 17/3276 463/42 |
| 2014/0080606 A1* | 3/2014 | Gillet | G10H 1/0008 463/35 |
| 2016/0001182 A1* | 1/2016 | Marr | A63F 13/30 463/42 |
| 2017/0287287 A1* | 10/2017 | Froy | G07F 17/3209 |

\* cited by examiner

*Primary Examiner* — Pierre E Elisca
(74) *Attorney, Agent, or Firm* — Patterson + Sheridan, LLP

(57) ABSTRACT

Embodiments provide techniques for generating game levels based on estimated quality score. For example, a set of training data can be retrieved that specifies attributes and quality scores for each of a plurality of game levels. One embodiment trains a machine learning model for the gaming application using the set of training data. A plurality of generated game levels are generated using a procedural level generation algorithm. Embodiments can determine, for each generated game level, a respective quality score, using the trained machine learning model, and upon determining that the quality score for the generated game level exceeds a threshold level of quality, can select the game level for transmission to a client of the gaming application.

18 Claims, 11 Drawing Sheets

| LEVEL ANALYSIS REPORT | 300 |
|---|---|
| COMPLETABLE ? | YES |
| AVERAGE COMPLETION TIME | 94.7s |
| NUMBER OF ROOMS | 12 |
| NUMBER OF ENEMIES | 17 |
| NUMBER OF ITEMS | 6 |
| NUMBER OF OBJECTIVES | 2 |
| AVERAGE AMOUNT OF BACKTRACKING | 8% |
| AVERAGE FAILURE RATE | 17% |

FIG. 3

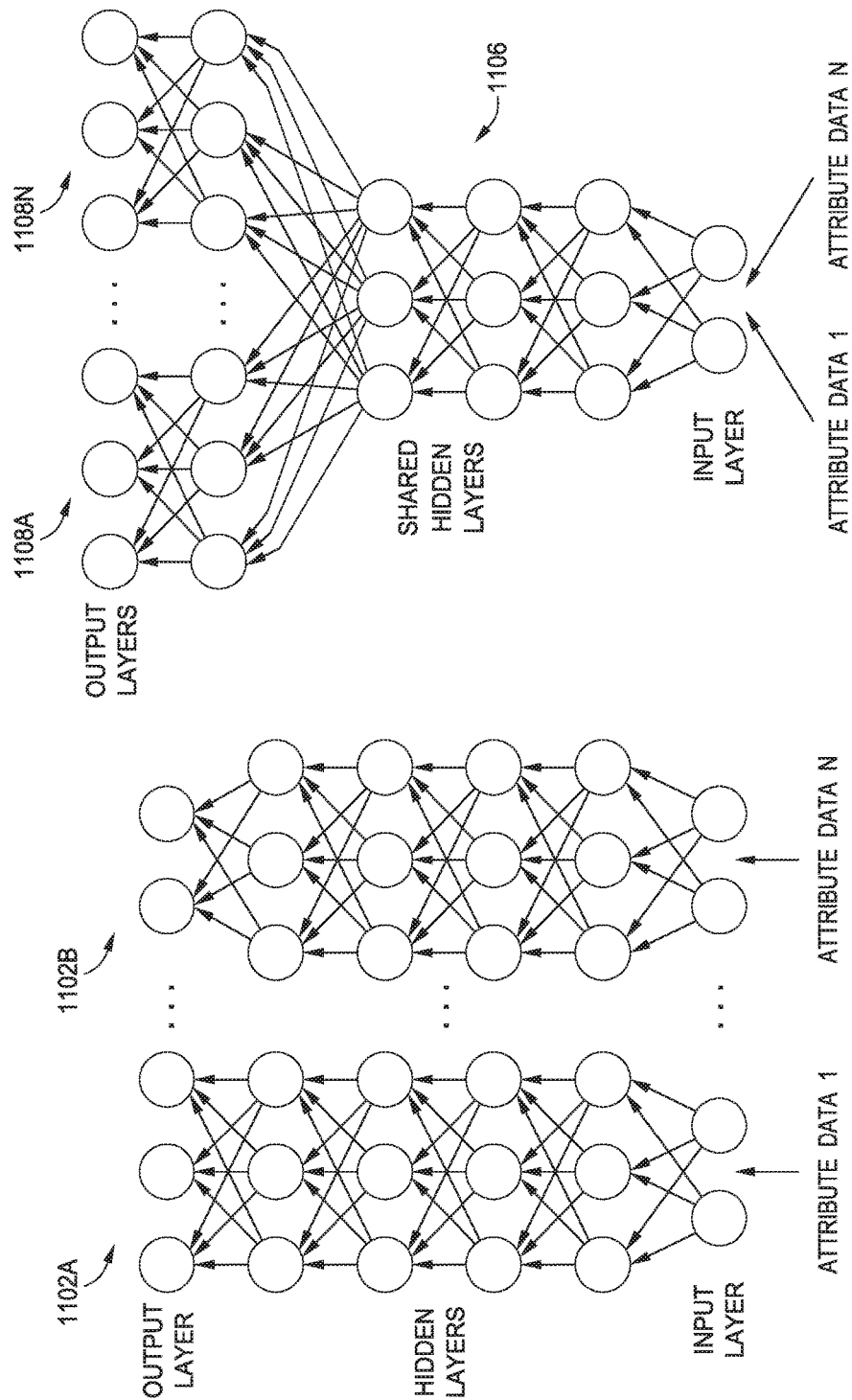

PROCEDURAL LEVEL GENERATION FOR GAMES

BACKGROUND

Embodiments described herein relate to computer games, and more particularly, to automated level generation based on calculated measures of level quality.

Computer games are available today on a variety of different platforms, ranging from dedicated gaming consoles to mobile devices. While many such computer games are still distributed through conventional techniques using distributed using physical media, such as compact discs (CDs) and digital versatile discs (DVDs), the growth of the Internet has made the digital distribution of these games more desirable and today a growing number of games are available through digital downloads, either as an alternative to physical media or as the exclusive distribution channel for the game. The lower costs of digital distribution over a computer network, versus distribution using a physical medium, can only be expected to further drive the growth of the digital distribution channel.

BRIEF DESCRIPTION OF DRAWINGS

FIG. 3 illustrates a level analysis report for a generated game level, according to various embodiments.

FIGS. 11A-B are conceptual illustrations of example neural networks that can be used for classifying game levels, according to embodiments described herein.

DETAILED DESCRIPTION

Embodiments described herein provide techniques for generating game levels for computer games. In one embodiment, a game level refers to data representing a locale, stage and/or mission within a gaming application, e.g., arranged in a defined format for game levels of a gaming application and stored in a file having a defined file extension for game levels of the gaming application. Embodiments described herein can be adapted to a number of different types of computer games. One embodiment provides a software application configured to selectively generate game levels for a two-dimensional (2D), two and a half dimensional (2.5D), or three-dimensional (3D) platform game, where each game level includes a plurality of different rooms. Each room, in turn, can include various virtual entities, such as enemy NPCs, friendly NPCs, virtual items, mission objectives and so on. In one embodiment, a game level can include one or more objectives which must be accomplished to successfully complete the game level, e.g., a game level could include a starting location for the player and could instruct the player to reach a defined endpoint within the game level. As another example, a game level could specify that the player must retrieve a particular object within the game level before reaching the defined endpoint. As yet another example, a game level could specify that the player must defeat a particular enemy NPC within the game level within a specified period of time, in order to successfully complete game level. Any suitable virtual content and objectives can be included within a game level, consistent with the functionality described herein.

Embodiments presented herein can procedurally generate game levels having an estimated difficulty that is appropriate to a given player, type of player or player base, e.g., embodiments may generate a more difficult game level for a final stage of a game or for a game marketed as being extremely difficult, while embodiments could generate an easier level for a game marketed towards young children.

Embodiments described herein can account for a variety of attributes when dynamically generating game levels for a gaming application. Embodiments presented herein provide techniques for generating game levels for a gaming application that have a sufficiently high quality score. More specifically, embodiments provide techniques for training a machine learning model, using the machine learning model to calculate a quality score for the game levels. In one embodiment, procedurally generated game levels having a sufficiently low quality score are deleted or otherwise removed, and generated game levels having a sufficiently high quality score are provided to gaming clients for play. According to various embodiments described herein, the machine learning model(s) can be constructed according to various machine learning techniques, including machine learning classification techniques as well as regression algorithms.

Figure 1:
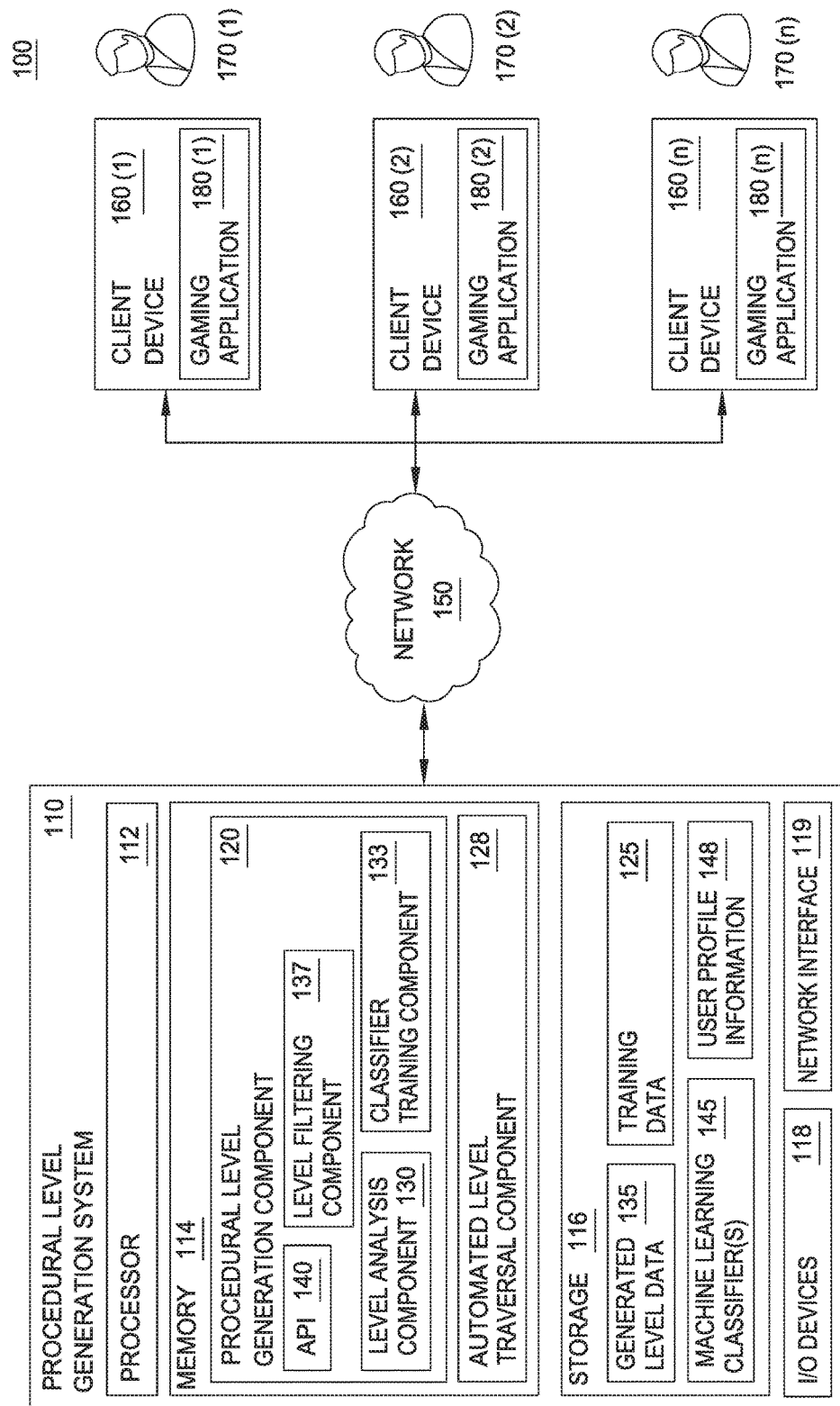
FIG. 1 illustrates a system that includes a procedural level generation component, according to various embodiments.

FIG. 1 illustrates a system that includes a procedural level generation component, according to various embodiments. As shown, the system 100 includes a procedural level generation system 110 and a plurality of client devices 160(1)-(N), interconnected via a network 150. The procedural level generation system 110 includes a processor 112, memory 114, storage 116, I/O devices 118, and a network interface 119. Processor 112 is intended to be representative of a single CPU, multiple CPUs, a single CPU having multiple processing cores, and the like. The memory 114 is included to be representative of a random access memory. As shown, memory 114 includes a procedural level generation component 120 and an automated level traversal component 128. The procedural level generation component 120 includes an API 140 through which clients can submit requests for game levels for a gaming application, a level filtering component 137 configured to cull game levels having a sufficiently low quality score, a level analysis component 130 and a classifier training component 133. The API 140, for instance, can enable the client devices 160(1)-(N) to submit requests for dynamically generated game levels for a particular gaming application. Storage 116 includes generated level data 135, training data 125, machine learning classifier(s) 145 and user profile information 148. The storage 116 may be a disk drive storage device. Although shown as a single unit, the storage 116 may be a combination of a fixed and/or removable storage, such as fixed disc drives, removable memory cards, optical storage, network attached storage (NAS), or storage-area-network (SAN). The network interface 119 may be any type of network communications allowing the procedural level generation system 110 to communicate with other computers via a data communications network (e.g., network 150).

In one embodiment, the procedural level generation component 120 dynamically generates game levels for the particular gaming application based on an associated set of rules and other logic. As shown, the generated level data 135 represents a plurality of game levels that have been procedurally generated by the procedural level generation component 120. In one embodiment, the classifier training component 133 is configured to train a machine learning classifier(s) 145 using the training data 125. The level analysis component 130 can use the machine learning classifier 145 to calculate a quality score for a given game level and gaming application. For instance, the level analysis component 130 could represent the quality scores on a scale of 0 to 100, where 0 represents the least amount of quality and 100 represents the greatest amount of quality. In one embodiment, a level analysis component 130 refers to an objectively quantifiable metric derived from statistical data, as opposed to any sort of subjective standard. However, this example is provided for illustrative purposes only and without limitation, and any form of representing quality scores can be used, consistent with the functionality described herein.

The training data 125 represents data collected for use in training the machine learning classifier(s) 145. Such training data 125 can include existing game levels (e.g., game levels that have been manually generated by game developers, procedurally generated game levels that have been tested by players, etc.), as well as quality scores corresponding to the existing game levels (e.g., feedback manually submitted by users playing the game levels, a measure of popularity for the game levels, etc.). The classifier training component 133 can use the training data 125 to train the machine learning classifier(s) 145. Put another way, the classifier training component 133 can construct a machine learning classifier 145 that maps attributes of game levels for a particular gaming application to measures of quality. As discussed in further detail below, the classifier training component 133 can also collect a portion of the training data 125 from the output of the procedural level generation component 120 (e.g., the levels generated by the procedural level generation component 120 using the trained machine learning classifier(s) 145) and can use such data to further refine the training of the machine learning classifier(s) 145. The machine learning classifier(s) 145 can represent any form of machine learning or deep learning classifier can be used, consistent with the functionality described herein. Examples of such machine learning and deep learning algorithms include, without limitation, Naïve Bayes classification, Logistic regression models and classifiers, Decision Tree regression models and classifiers, Support Vector Machine (SVM) classifiers, and so on. Additional example include neural network classifiers and regression models (including deep neural network classifiers and regression models), Decision Forest classifiers and regression models, Perceptron classifiers, Linear and Bayesian linear regression models, and Bayes point machine classifiers. More generally, any suitable machine learning model, known or unknown, can be used, consistent with the functionality described herein.

For example, the procedural level generation component 120 could procedurally generate a first game level (represented as generated level data 135). The level analysis component 130 could determine a quality score for the first game level for the gaming application, using the machine learning classifier(s) 145. In one embodiment, the level analysis component 130 is configured to determine a quality score for the first game level, using a plurality of machine learning classifiers 145 (or more generally, machine learning models), each producing a respective quality score (e.g., by taking a weighted average of the quality scores produced by the machine learning classifiers 145). According to one embodiment, the machine learning models (e.g., machine learning classifiers) are configured to generate a quality score, representing a measure of likelihood that the particular game level belongs to a classification of quality game levels. In a particular embodiment, the machine learning models (e.g., models generated according to a regression algorithm) are configured to generate an entertainment score that represents an estimated measure of fun (or user enjoyment) when playing the game level.

In one embodiment, the level analysis component 130 is configured to analyze a plurality of aspects of the first game level using a plurality of machine learning classifiers 145, where each of the plurality of machine learning classifiers 145 is trained by the classifier training component 133 to calculate a quality score for the game level based on a respective one of the plurality of aspects. For example, a first machine learning classifier could be trained (i.e., by the classifier training component 133) to score game levels based on a complexity of navigating through the first game level. In such an embodiment, the level analysis component 130 could construct a room connection graph for the first game level and to provide such a room connection graph as input to the first machine learning classifier. The level analysis component 130 could determine a quality score for the navigation of the game level, using the first machine learning classifier.

As another example, a second machine learning classifier could be trained (i.e., by the classifier training component 133) to score game levels based on challenges within portions of the game levels (e.g., a jump within a room of a game level, trap or enemy placement within the room, etc.). The level analysis component 130 could then determine a quality score for the challenges within the game level, using the second machine learning classifier.

In a particular embodiment, the level analysis component 130 is configured to generate a plurality of quality scores for each of the plurality of aspects of the first game level, using the machine learning classifiers 145. The level analysis component 130 can then aggregate the plurality of quality scores into an aggregate quality score for the first game level. For example, the level analysis component 130 could determine an average of the plurality of quality scores. In one embodiment, the level analysis component 130 is configured to weight the various aspects of the plurality of aspects differently, and such weight values can be applied when calculating the aggregate quality score for the first game level (i.e., the level analysis component 130 could calculate a weighted average). As an example, the quality score for the challenges within the game level could be given a greater weight than the room navigation quality score.

The level filtering component 137 could then examine the determined quality score (or aggregate quality score) to determine whether to cull the first game level. As an example, if the level filtering component 137 determines a relatively low quality score for the first game level, the level filtering component 137 could delete the first game level from the generated level data 135. In one embodiment, the procedural level generation component 120 is configured to refine the game levels culled by the level filtering component 137. For instance, the procedural level generation component 120 could determine one or more aspects of a culled game level that resulted in the game level receiving a low quality score, e.g., the procedural level generation component 120 could determine that the quality score determined based on the room connection graph of the game level was low. The procedural level generation component 120 could then refine one or more aspects of the game level. Continuing the above example, the procedural level generation component 120 could generate a new room layout, and could submit the refined game level for analysis by the level analysis component 130. If the level analysis component 130 then determines, using the machine learning classifier(s) 145, that the refined game level has a sufficiently high quality score, the refined game level can be made available for player consumption (e.g., responsive to a request from the API 140).

As an example, the client device 160(1) could transmit a request for dynamically generated game levels for a particular gaming application, over the network 150, to the API 140 of the procedural level generation component 120. The procedural level generation component 120, in turn, could generate the generated level data 135 that includes a plurality of procedurally generated game levels. The level analysis component 130 could then calculate a respective quality score for each of the procedurally generated game levels (e.g., using the machine learning classifier(s) 145) and the level filtering component 137 could select only a subset of the plurality of procedurally generated game levels having a quality score higher than a threshold level of quality. The procedural level generation component 120 could then transmit the selected levels to the client device 160(1) over the network 150, for an instance of the gaming application on the client device 160(1). By doing so, the procedural level generation component 120 can provide dynamically generated game levels to the instance of the gaming application on the client device 160(1), while excluding any dynamically generated game levels having a sufficiently low measure of quality.

In one embodiment, such requests to the API 140 for dynamically generated game levels can include one or more parameters that are used in evaluating the dynamically generated game levels and ultimately selecting one or more game levels to transmit to the client device from which the request was received. For example, such a request could specify a user associated with the request from the client device 160(1), and the level analysis component 130 could use this information to retrieve a set of user preferences from the user profile information 148 for the user in question. The level analysis component 130 could then use such information to select a particular classifier for evaluating game levels. For example, if the set of user preferences indicate that a particular user tends to prefer game levels with a higher level of difficulty, the level analysis component 130 could use such information to select a classifier trained with user data from users who tend to prefer game levels with a higher level of difficulty, and could use such a classifier to calculate the quality score of various game levels. As another example, the level analysis component 130 could determine a preferred type of objective in game levels (e.g., based on the set of user preferences) and could use such information to determine the quality score for the game level (e.g., by influencing the quality score determined by a machine learning classifier 145 configured to score game levels based on objective type). In a particular embodiment, users of the client devices 160(1)-(N) can explicitly specify their preferences in the request transmitted to the API 140, and the level analysis component 130 can use such explicitly specified preferences to select one or more dynamically generated game levels to transmit in response to the request based on the measurements/weights of aspects of the levels predicted by the classifiers.

In one embodiment, the procedural level generation component 120 is configured to use a game level generation algorithm that involves substantial amount of variation and randomness in generating the game levels. That is, the procedural level generation component 120 could effectively take more chances in terms of introducing variation and randomness in generating game levels, since the level filtering component 137 can detect and exclude game levels that have a sufficiently low quality score (e.g., game levels that are most problematic or otherwise not fun to play).

In one embodiment, in training one of the machine learning classifier(s) 145, the classifier training component 133 can analyze the game levels within the training data 125 to determine metadata describing the game levels. Such metadata could include, without limitation, a number of rooms within the game level, a number of enemy NPCs within the game level, a number of friendly NPCs within the game level, a number of items within the game level, and a number of objectives within the game level. In a particular embodiment, such metadata can include any measurable attributes of a game level, consistent with the functionality described herein. The classifier training component 133 can use such metadata in training the machine learning classifier 145. When analyzing generated game levels within the generated level data 135, the level analysis component 130 can determine metadata describing the generated game levels and can use such metadata as an input to the corresponding machine learning classifier 145.

According to one embodiment, the level analysis component 130 can utilize the automated level traversal component 128 in scoring the game levels within the generated level data 135. The automated level traversal component 128 can represent computer logic that is configured to attempt to complete a game level within the rules of a particular gaming application. Put another way, the automated level traversal component 128 emulates a player and automatically plays and attempts to successfully complete game levels within the particular gaming application.

As an example, the automated level traversal component 128 could attempt to complete the particular game level a number of times. In such an embodiment, the level analysis component 130 could collect metadata describing the automated playthrough of the game level. For example, such metadata could include, without limitation, an indication of whether the automated level traversal system was ever able to successfully complete the game level, an average completion time it took the automated level traversal system to complete the game level, an average amount of backtracking (i.e., walking over the same portion of the game level more than once) involved in the automated level traversal system completing the game level, and an average failure rate of the automated level traversal system in attempting to complete the level.

In one embodiment, the level analysis component 130 uses the metadata collected during the automated playthroughs by the automated level traversal component 128 when determining the quality score for the game level. For example, for a particular generated level within the generated level data 135, the automated level traversal component 133 could attempt to playthrough the particular generated level a defined number of times and could collect metadata describing the attempted playthroughs. The level analysis component 130 could then use the metadata describing the attempted playthroughs of the particular game level as an input to a machine learning classifier 145 (e.g., a classifier trained by the classifier training component 133 based on metadata describing attempted playthroughs of the game levels within the training data 125 by the automated level traversal component 128) for use in determining the quality score for the particular game level.

According to various embodiments described herein, the machine learning classifier(s) 145 can consider any number of different factors and game level attributes. Moreover, the machine learning classifier(s) 145 can be configured to weight these factors differently relative to one another, in scoring the game level. Likewise, the level analysis component 130 can be configured to weight the various quality scores for a game level produced by multiple machine learning classifiers 145 differently relative to one another, in determining the aggregate quality score for the game level. As an example, and without limitation, upon analyzing the training data 125, the machine learning classifier generated by the level analysis component 130 could indicate that while the number of rooms within a game level can impact the estimated measure of user enjoyment in playing the game level, the average failure rate in automated playthroughs of the game level generally has a much greater impact on the estimated measure of user enjoyment. As such, the level analysis component 130 can generate a respective weight for each of the factors considered by the machine learning classifier.

Figure 2:
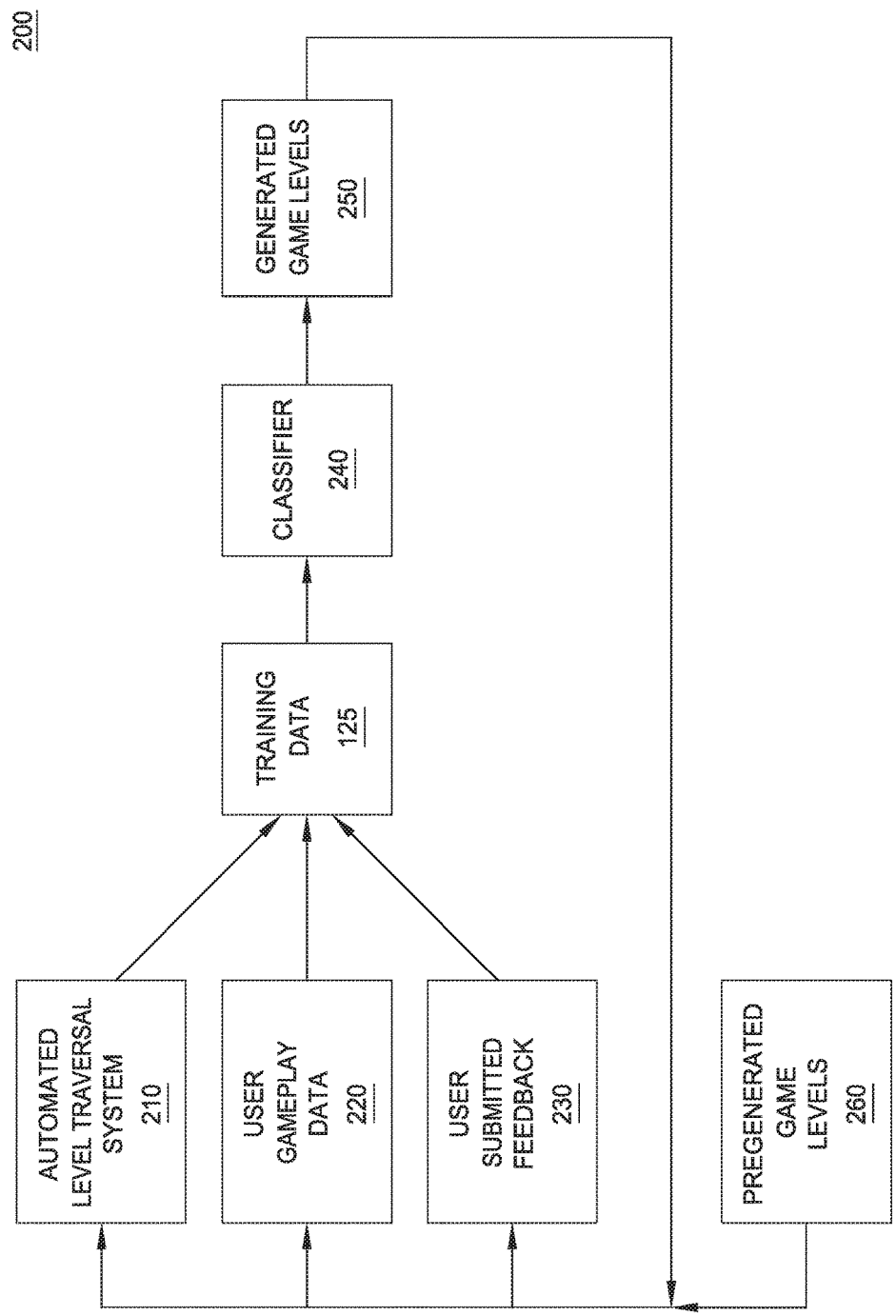
FIG. 2 is a block diagram illustrating exemplary sources of training data for a machine learning classifier, according to various embodiments.

In training the machine learning classifier(s) 145, the classifier training component 133 can collect the training data 125 from a variety of sources. FIG. 2 is a block diagram illustrating exemplary sources of training data for a machine learning classifier, according to various embodiments. In the depicted embodiment, the diagram 200 illustrates that the training data 125 is made up of data from automated level traversal data 210 (e.g., data collected from monitoring playthroughs by the automated level traversal component 128, user gameplay data 220 (e.g., data collected by monitoring playthroughs by users) and user submitted feedback 230. In the depicted embodiment, such automated level traversal data, user gameplay data 220 and user submitted feedback 230 initially come from playthroughs of the pre-generated game levels (e.g., game levels that were manually generated by game developers).

As discussed above, the automated level traversal data 210 can include metadata describing attempted playthroughs of a particular game level in the set of training data 125. Similarly, the user gameplay data 220 can also include data collected during playthroughs of the particular game level, but represents data collected during playthroughs by actual users (as opposed to playthroughs by the automated level traversal component 128). For example, such user gameplay data could include, without limitation, an indication of whether the user(s) was ever able to successfully complete the game level, an average completion time it took the user(s) to complete the game level, an average amount of backtracking involved in the user(s) completing the game level, and an average failure rate of the user(s) in attempting to complete the level.

In one embodiment, the user submitted feedback 230 represents an indication of the quality of the game level, based on the user's playthrough of the game level. For example, a gaming application of the gaming applications 180(1)-(N) could be configured to selectively prompt users with an interface upon completion of the game level, asking the user to indicate how the user perceived the quality of the game level (e.g., on a scale of 1 to 10). As another example, the user submitted feedback 230 could include manually submitted feedback by the game developers and game testers playing through the particular game level. In a particular embodiment, the user submitted feedback 230 can include implicit feedback from users, such as a measure of popularity of the game level across clients of the gaming application. That is, if the particular game level is extremely popular relative to other game levels in the gaming application, this can implicitly indicate that the particular game level is of high quality.

Upon retrieving the training data 125, the classifier training component 133 can train one of the machine learning classifiers 145 to produce the trained classifier 240. In one embodiment, the classifier training component 133 is configured to train multiple machine learning classifiers 145, each configured to score game levels based on a respective aspect(s) of the game level.

According to one embodiment described herein, the procedural level generation component 120 can generate a game level for the particular gaming application, and the level analysis component 130 can determine attributes of the generated game level and can use the trained machine learning classifier 240 to determine a quality score for the generated game level. As discussed above, the automated level traversal component 128 could attempt to traverse the generated game level a number of times, and the level analysis component 130 can collect data describing these attempted traversals. The level analysis component 130 could then use such data as an input to a machine learning classifier configured to score game levels based on automated traversal data, and could use the output of the machine learning classifier in determining the quality score for the game level.

The level filtering component 137 could cull any generated game levels having a sufficiently low quality score (e.g., a quality score below a threshold level of quality) to produce the generated game levels 250. Embodiments can collect further training data based on playthroughs of the generated game levels 250, for use in further refining the machine learning classifier(s) 145. For example, the automated level traversal component 128 could attempt to playthrough the generated game levels 250 a defined number of times and the level analysis component 130 could collect data describing the automated playthrough attempts. Likewise, user gameplay data 220 and user submitted feedback 230 for the generated game levels 250 can be collected (e.g., from the client devices 160(1)-(N)). This additional training data 125 can then be used to further train the classifier 240, thereby refining and improving the machine learning classifier over time.

In determining the attributes of the generated game level, the level analysis component 130 can be configured to generate a level analysis report. FIG. 3 illustrates one such level analysis report for a generated game level. As shown, the level analysis report 300 includes an indication of whether an automated level traversal system was ever able to successfully complete the game level, an average completion time it took the automated level traversal system to complete the game level, data describing attributes of the game level (i.e., number of rooms, number of enemies, number of items, number of objectives), an average amount of backtracking by the automated level traversal system in completing the generated game level and an average failure rate of the automated level traversal system attempting to complete the game level. The level analysis component 130 could use the level analysis report 300 as an input to the train machine learning classifier to generate an estimated quality score for the generated game level. As the procedural level generation component 120 can generate game levels and the level analysis component 130 can calculate quality scores for the generated game levels relatively quickly, embodiments can generate a substantial number of game levels having a sufficiently high quality score in a relatively small amount of time. As a result, the instances of the gaming application 180(1)-(N) across the various client devices 160(1)-(N) can repeatedly retrieve newly generated game levels, making each playthrough of the gaming application different. This, in turn, can help to extend the life of the gaming application, as the users 170(1)-(N) are constantly challenged by new, dynamically generated game levels.

In one embodiment, the level analysis component 130 is configured to analyze a game level at various stages during the generation of the game level and to provide feedback (i.e., in the form of quality scores for the current iteration of the game level) to the game level generation logic for use in refining the game level. For example, the game level generation logic could define an initial volume of the game level (e.g., how many rooms are included in the game level, how the rooms are arranged, etc.). The level analysis component 130 could then analyze the partially complete game level using one or more of the machine learning classifiers 145, in order to calculate a quality score for the partially complete game level and to determine a quality score for the game level. The game level generation logic could then update the partially complete game level by adding traversable props (e.g., staircases, slag pools, teleporters, platforms, elevators, and the like) to the partially complete game level, and again the level analysis component 130 could analyze the updated game level using the machine learning classifier to determine a quality score of the game level. The output of the classifier could then be used, for example, by the game level generation logic to refine the updated game level as needed. For example, the game level generation logic could generate multiple updated game levels with various arrangements of different traversable props, and could select the arrangement that results in the greatest quality score based on the output of the classifier. The game level generation logic could then continue to iteratively add elements (e.g., enemies, items, spawn points, artwork, etc.) to the game level and to refine the type, arrangement and number of elements based on the output of the classifier.

Figure 4:
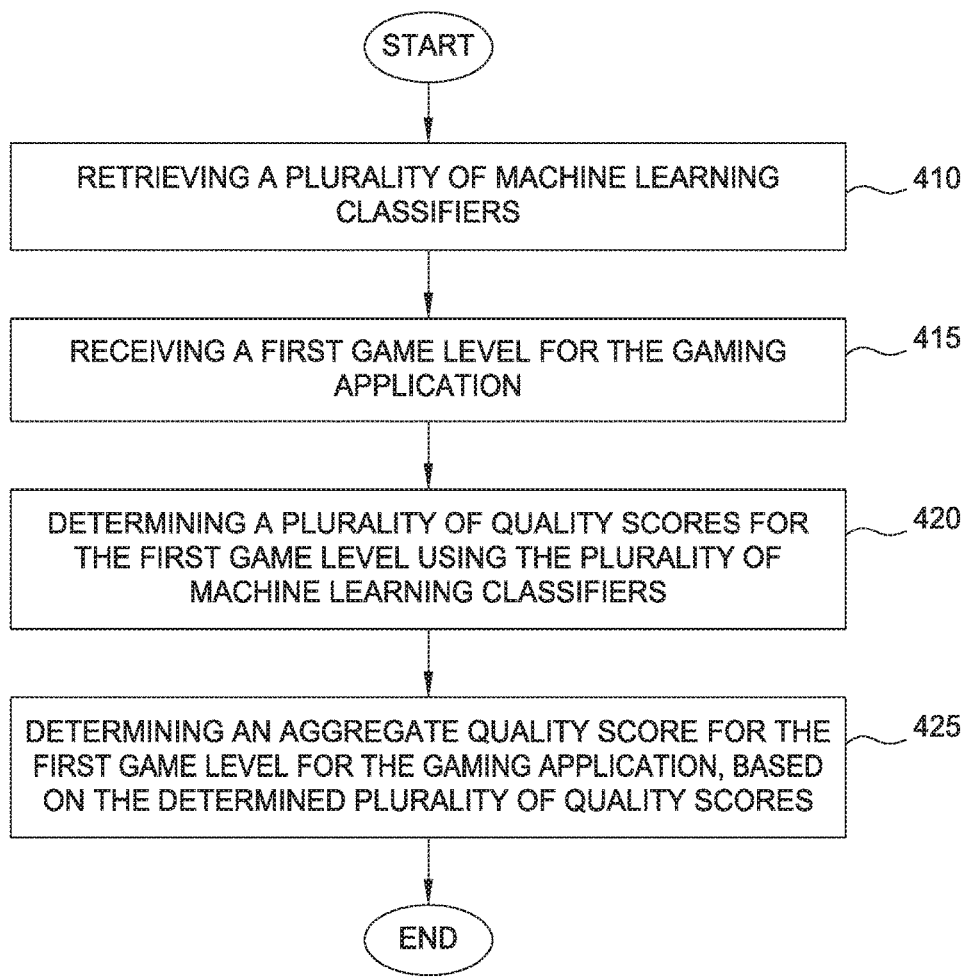
FIG. 4 is a flow diagram illustrating a method of determining a quality score for a game level, according to various embodiments.

FIG. 4 is a flow diagram illustrating a method of determining a quality score for a game level, according to various embodiments. As shown, the method 400 begins at block 410, where the level analysis component 130 retrieves a plurality of machine learning classifiers 145 for scoring game levels of a gaming application. For example, the machine learning classifiers 145 could be constructed according to a machine learning or deep learning algorithm, and the level analysis component 130 could train the machine learning classifier 145 using the training data set 125. As discussed above, the machine learning classifier 145 can be configured to correlate attributes of a particular game level being input into the classifier to a quality of the game level when played by users in the particular gaming application.

The level analysis component 130 receives a first game level for the gaming application (block 415). For example, the first game level could be a procedurally generated game level that was generated by the procedural level generation component 120. As discussed above, the procedural level generation component 120 could use a more relaxed (i.e., less constrained) level generation algorithm in generating the first game level. The level analysis component 130 determines a plurality of quality scores for the first game level of the gaming application, using the plurality of machine learning classifiers 145 (block 420). The level analysis component 130 then determines an aggregate quality score for the first game level, based on the determined plurality of quality scores (block 425). For example, the level analysis component 130 could compute a weighted average of the plurality of quality scores, using a respective weight value corresponding to each of the plurality of machine learning classifiers.

Figure 5:
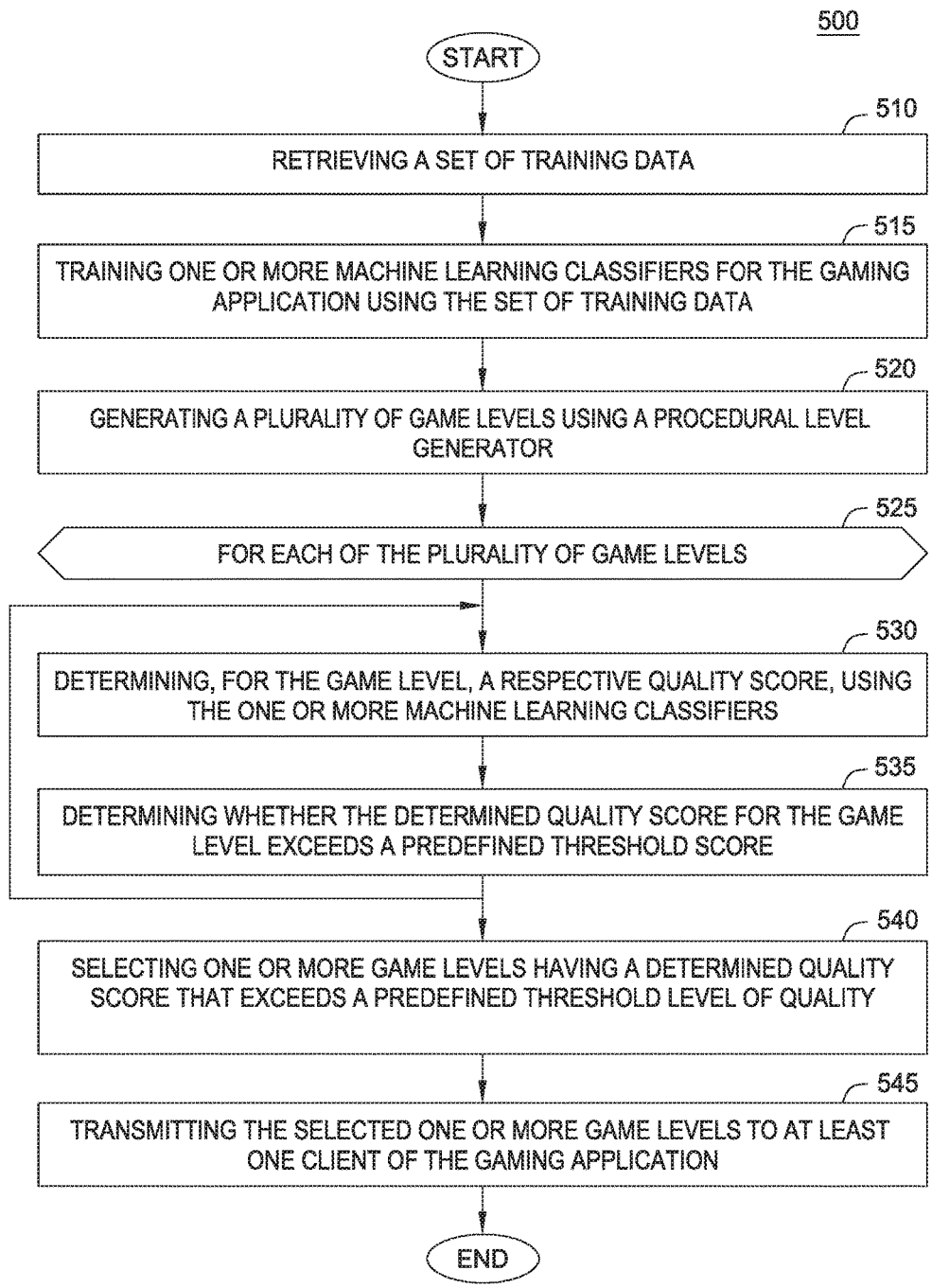
FIG. 5 is a flow diagram illustrating a method of selecting two or more generated game levels based on determined quality scores, according to various embodiments.

FIG. 5 is a flow diagram illustrating a method of selecting generated game levels based on quality scores, according to various embodiments. As shown, the method 500 begins at block 510, where the level analysis component 130 retrieves a set of training data. For example, the set of training data could be collected, as shown in FIG. 2 and discussed above. In one embodiment, the set of training data specifies, for each of a plurality of game levels for the gaming application, a respective plurality of values for a plurality of attributes of the game level and a respective plurality of quality scores for the game level. As discussed above, such attributes can include data describing the game level itself (e.g., number of items, number of rooms, etc.) as well as data describing automated playthroughs of the game level (e.g., average failure or success rate of automated playthrough attempts, average time of automated playthroughs, etc.). The quality scores can be based on, for example, responses to in-game queries about how enjoyable users found a particular game level, manual indications of game level quality from game developers and testers, indications of popularity of the game level across users, and so on.

The classifier training component 133 uses the plurality of values for the plurality of attributes, together with the quality scores, in the training dataset, to train a machine learning classifier(s) 145 for the gaming application (block 515). The procedural level generation component 120 generates a plurality of generated game levels (block 520). The method 500 then enters a loop, where for each of the two or more generated game levels (block 535), the level analysis component 130 determines, for the generated game level, a respective quality score(s), using the trained machine learning classifier(s) 145 (block 540). In doing so, the level analysis component 130 can be configured to determine a level analysis report specifying a number of different attributes of the generated game level. Additionally, as discussed above, the level analysis component 130 can be configured to use the automated level traversal component 128 to play the generated game level a number of times and the level analysis component 130 can monitor such playthroughs and include collected data describing attributes of the automated playthroughs in the level analysis report. The level analysis component 130 could then provide the level analysis report as an input to one of the machine learning classifier(s) to determine the quality score for the generated game level.

In the depicted embodiment, the level filtering component 137 determines whether the quality score for the generated game level exceeds a threshold level of quality (block 535). Such a threshold level of quality could be expressed in whatever units are used to represent the quality score, and the level filtering component 137 can compare the quality score for the generated game level against the threshold level of quality to determine whether the quality score exceeds the threshold. In one embodiment, the threshold level of quality is a configurable value and can be defined by the administrator of the procedural level generation component 120. In one embodiment, the threshold level of quality can vary across different gaming applications and the administrator can fine tune the threshold to best match each gaming application. For example, for a gaming application where each game level takes a substantial amount of time to complete and thus fewer distinct game levels are needed overall, the threshold level of quality could be set relatively high. Doing so results in more levels being excluded (i.e., due to their quality score not exceeding the threshold level), but helps ensure higher quality levels overall. The procedural level generation component 120 selects one or more generated game levels having a quality score that exceeds the threshold level of quality (block 540) and transmits the selected generated game levels to at least one client of the gaming application (block 545).

In one embodiment, the procedural level generation component 120 can continue to collect user gameplay data 220 and user submitted feedback 230. For example, upon transmitting the selected generated game levels to the at least one client of the gaming application, the client could prompt the user after the user has played through one of the generated game levels to elicit user feedback characterizing the quality of the game level. The procedural level generation component 120 could receive this information from the client and the level analysis component 130 could then use this information to further refine the machine learning classifier(s) 145. Doing so improves the accuracy of the machine learning classifier(s) 145, relative to changes in user preferences, user demographics and so on over the life of the game. Moreover, as the game itself evolves (e.g., through patches, updates and other downloadable content), the attributes of a fun game level may accordingly change. By continually refining the machine learning classifier 145 using user feedback for generated game levels, embodiments can account for these changes over time.

Figure 6:
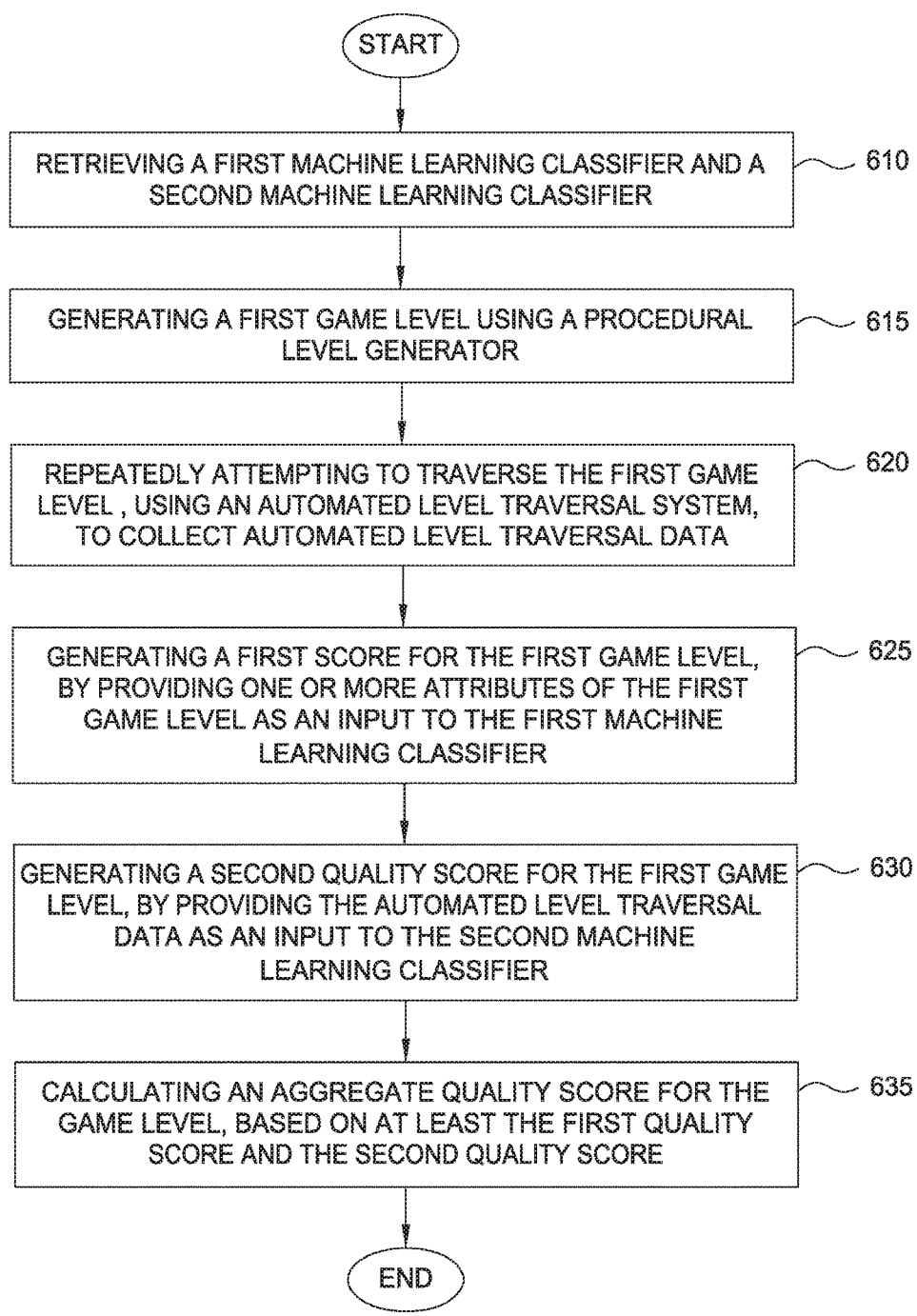
FIG. 6 is a flow diagram illustrating a method of determining a quality score for a game level using an automated level traversal algorithm, according to various embodiments.

FIG. 6 is a flow diagram illustrating a method of determining a quality score for a game level using an automated level traversal algorithm, according to various embodiments. As shown, the method 600 begins at block 610, where the level analysis component 130 retrieves first and second machine learning classifiers 145. In one embodiment, the first machine learning classifier 145 was trained using a set of training data that specifies, for each of a plurality of game levels for the gaming application, a respective plurality of values for a plurality of attributes of the game level and a respective plurality of quality scores for the game level, while the second machine learning classifier was trained using attributes of automated level traversal attempts of the game levels made by an automated level traversal component 128.

The procedural level generation component 120 generates a first game level using a procedural level generator (block 615). The analysis component 130 repeatedly attempts to traverse the first game level using an automated level traversal component 128, to collect the automated level traversal data (block 620). As discussed above, such data can include, without limitation, indications of whether the level was successfully completable, an average completion time, a failure rate of automated completion attempts, and so on.

The level analysis component 130 generates a first quality score for the first game level, by providing one or more attributes of the first game level as an input to the first machine learning classifier (block 625). In one embodiment, the level analysis component 130 determines attributes of the first game level (e.g., a room connection graph) and uses such attributes as at least a portion of the input to the first machine learning classifier. Additionally, the level analysis component 130 generates a second quality score for the first game level, by providing the automated level traversal data as an input to the second machine learning classifier (block 630). The level analysis component 130 then calculates an aggregate quality score for the game level, based on at least the first and second quality scores (block 635).

In one embodiment, the procedural level generation component 120 uses the quality score for the first game level to cull generated game levels having a sufficiently low quality scores, which may indicate that the generated game levels are problematic, erroneous or otherwise not fun to play. For example, if the level analysis component 130 determines that a particular game level was not completable using the automated level traversal component 128 (e.g., based on a quality score for the game level determined by one of the machine learning classifiers 145), this could indicate that the game level is likely to be problematic and may remove the particular game level as a candidate for selection for user gameplay. For example, a particular game level may have an objective of reaching an end location from a starting location, but no path may exist within the game level between the starting location and the end location, thereby making the objective impossible to accomplish.

As another example, although a particular game level may not be impossible to complete, the difficulty of the game level may be so high that the user experience of playing the game level would not be enjoyable. For example, for a children's gaming application, the optimal difficulty of game levels may be relatively low, as the average user may be quite young and could become easily frustrated with exceedingly difficult game levels. As such, the level analysis component 130 could heavily weight the output of a machine learning classifier 145 that is trained to score game levels based on the difficulty of the game levels, in calculating the aggregate quality score for the game level. Of note, however, is that such calculations can vary heavily across different gaming applications. As an example, for a game that is marketed and renowned for having a high level of difficulty, a game level that the automated level traversal system indicates is quite difficult may lead to a higher quality score, while another game level that is perceived as relatively simple could lead to a lower quality score. Thus, the behavior of the machine learning classifier 145 can vary greatly across different gaming applications and across different sets of training data.

Figure 7:
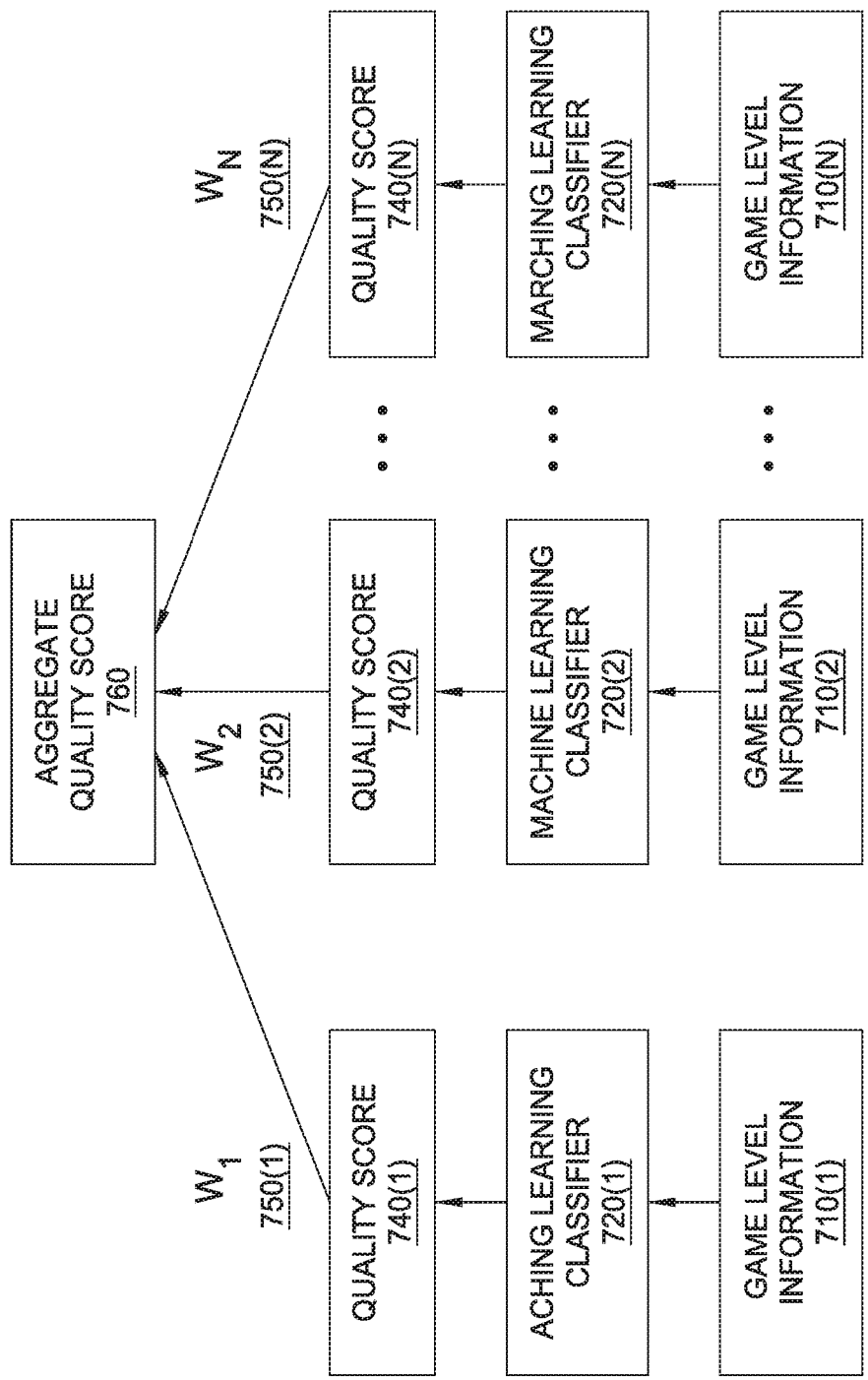
FIG. 7 is a block diagram illustrating a method of generating an aggregate quality score for a game level, according to one embodiment described herein.

FIG. 7 is a block diagram illustrating a method of generating an aggregate quality score for a game level. As shown, the diagram 700 depicts various types of game level information 710(1)-(N) being input into a plurality of machine learning classifiers 720(1)-(N). For example, the machine learning classifier 720(1) could be trained to rate the quality of a game level's room volume, and could take as input the game level information 710(1) which specifies a room connection graph for a game level. As another example, the machine learning classifier 720(2) could be trained to rate the quality of a game level's traversable props, and could take as input the game level information 710(2) which specifies the selection and arrangement of traversable props within the game level, while the machine learning classifier 720(N) could be trained to rate the quality of a game level's enemy selection and placement, and could take as input the game level information 710(1) which specifies the selection and arrangement of enemies within the game level. As shown, each of the machine learning classifiers 720(1)-(N) produces a respective quality score 740(1)-(N), which represents the estimated quality of the game level based on the classifiers' analysis of the game level information 710(1)-(N). The level analysis component 130 could calculate the aggregate quality score 760 for the game level (e.g., as a weighted average), by applying the weights 750(1)-(N) to the quality scores 740(1)-(N). For example, the level analysis component 130 could multiple the quality scores 740(1)-(N) by their corresponding weights 750(1)-(N) in order to produce the aggregate quality score 760.

Figure 8:
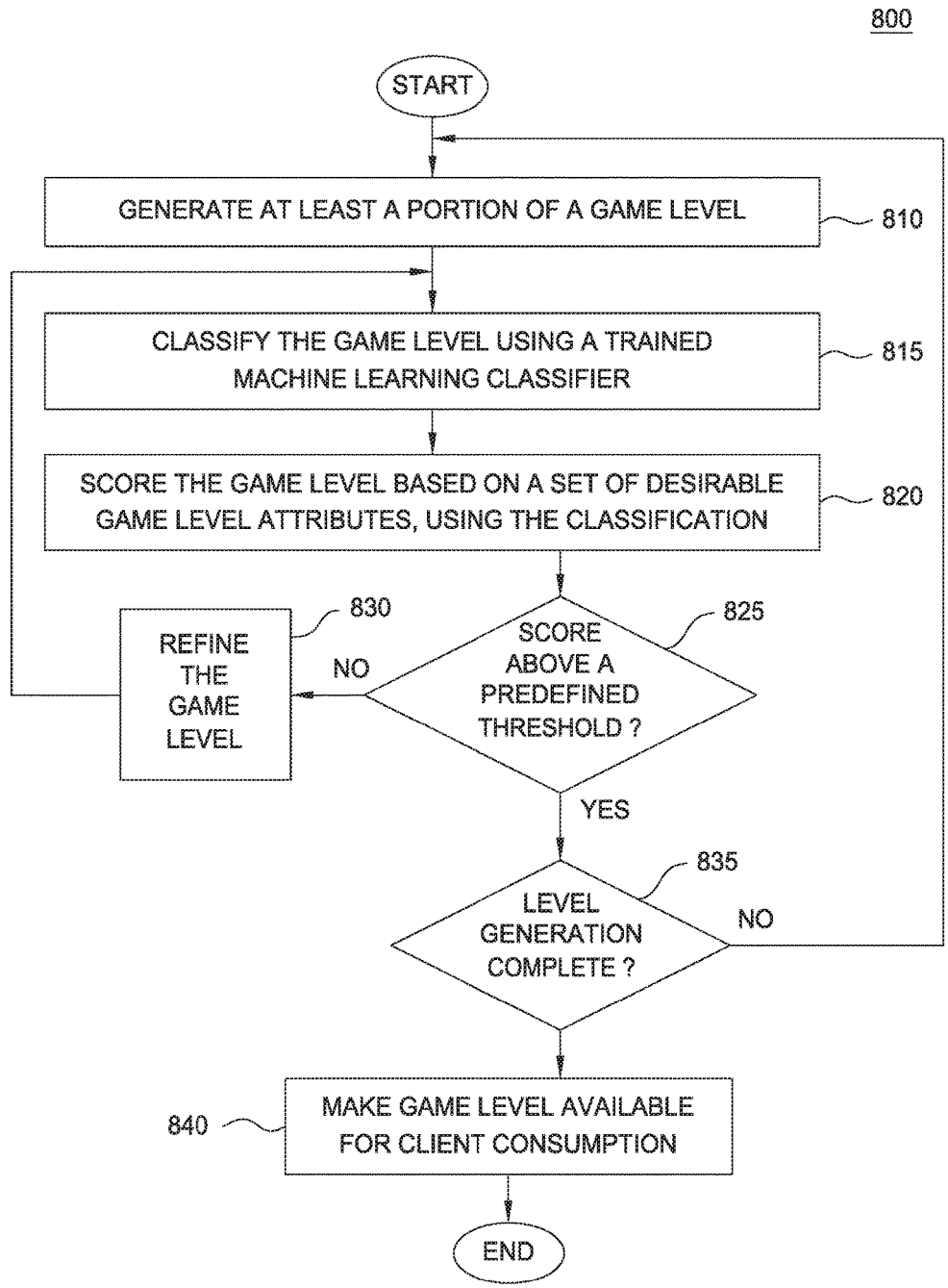
FIG. 8 is a flow diagram illustrating a method of refining a game level, according to one embodiment described herein.

FIG. 8 is a flow diagram illustrating a method of refining a game level, according to one embodiment described herein. As shown, the method 800 begins at block 810, where the procedural level generation component 120 generates at least a portion of a game level. For example, the procedural level generation component 120 could initially generate only the volume (or hull) of the game level (e.g., a number of rooms that are interconnected in some fashion). The level analysis component 130 classifies the generated game level using a trained machine learning classifier 145 (block 815). In one embodiment, the machine learning classifier 145 used to score the generated game level is selected by the level analysis component 130, based on the portion of the game level that was generated. For example, the level analysis component 130 could select a machine learning classifier 145 for scoring game levels based on volume, and could use such a classifier to generate a quality score for the game level, based on a set of desirable game level attributes. In one embodiment, the level analysis component 130 is configured to determine the set of desirable game level attributes based on user profile information 148 describing a user for which the game level is being generated. In a particular embodiment where the game level is not generated for one specific user, the level analysis component 130 could determine the set of desirable game level attributes based on general preferences of a player base of the gaming application.

The level analysis component 130 determines whether the determined quality score is above a threshold level of quality (block 825). If no, the procedural level generation component 120 refines the game level (block 830). For example, the procedural level generation component 120 could regenerate the entirety of the volume of the game level. As another example, the procedural level generation component 120 could analyze the game level and could determine a particular area within the game level to refine (e.g., a problematic set of rooms within the game level), without regenerating the entirety of the volume of the game level. According to various embodiments, the procedural level generation component 120 can perform any sort of refinement operation for the game level, consistent with the functionality described herein.

Once the procedural level generation component 120 has refined the game level, the level analysis component 130 classifies the refined game level (block 815) and determines a quality score for the refined game level (block 820). If the level analysis component 130 determines that the quality score for the refined game level is still below the threshold (block 825), the refinement process (i.e., blocks 830, followed by blocks 815 and 820) is repeated until the quality score is determined to be above the threshold level of quality.

Once the level analysis component 130 determines the quality score for the game level (or a refined iteration of the game level) exceeds the threshold (block 825), the level analysis component 130 determines whether the generation of the game level is complete (block 835). For instance, the procedural level generation component 120 could be configured to iteratively generate the game level, wherein a portion of the game level is added during each iteration, e.g., after the volume of the game level is generated, the procedural level generation component 120 could add traversable props to the game level on the next iteration, followed by adding items and player spawn locations on the next iteration, adding enemy spawns on the subsequent iteration, adding artwork and backgrounds to the game level on the following iteration, and so on. If the procedural level generation component 120 determines that this iterative process is not yet complete (block 835), the method returns to block 810, where the procedural level generation component 120 generates the next portion of the game level. Once the procedural level generation component 120 determines that the iterative process is complete and the game level is fully generated, the procedural level generation component 120 makes the game level available for client consumption (block 840) and the method 800 ends. For example, the procedural level generation component 120 could add the game level to a set of game levels that can be provided to the client devices 160(1)-(N), responsive to requests to the API 140.

Figure 9:
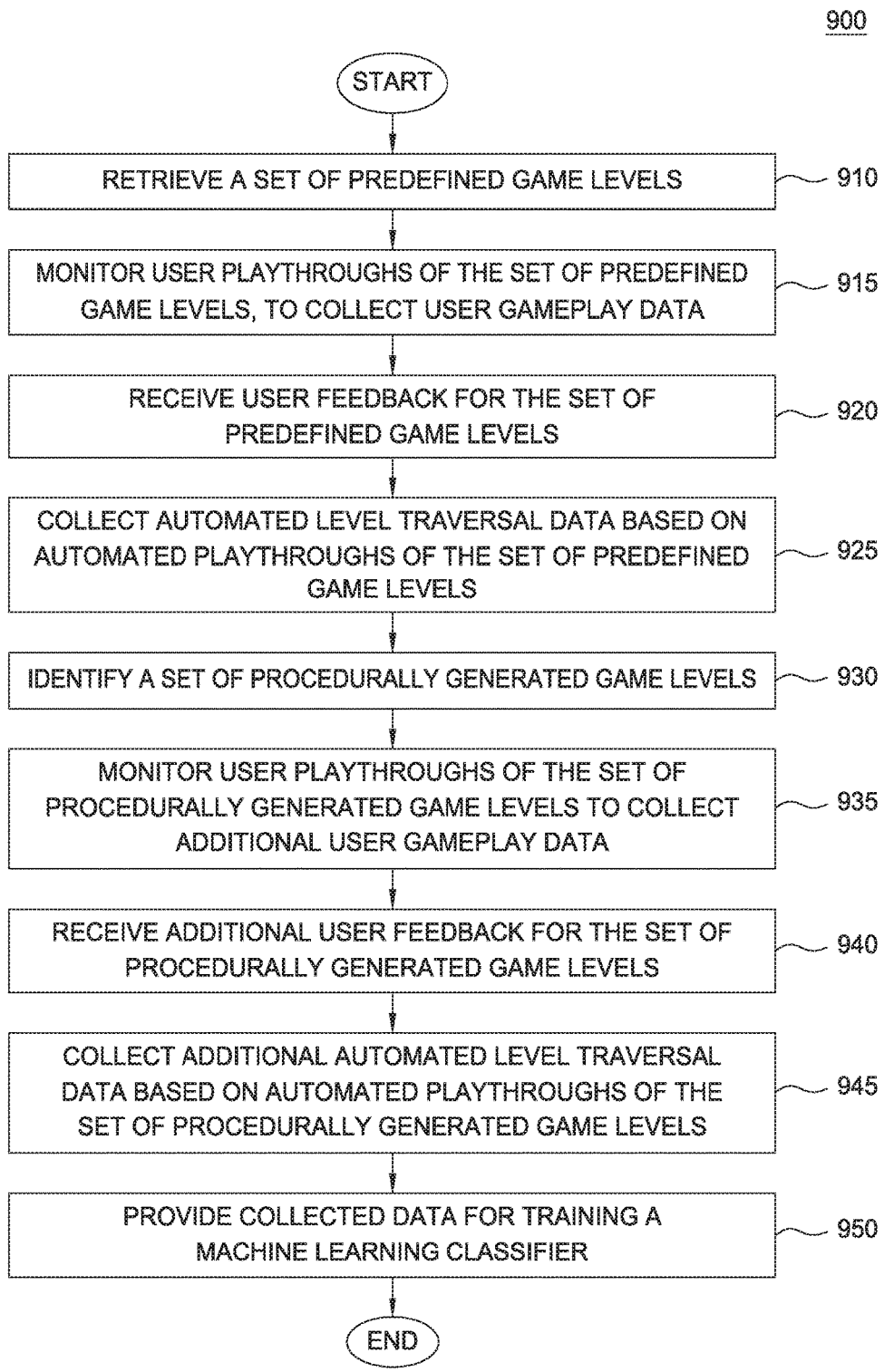
FIG. 9 is a flow diagram illustrating a method of collecting training data for a machine learning classifier for scoring game levels, according to one embodiment described herein.

FIG. 9 is a flow diagram illustrating a method of collecting training data for a machine learning classifier for scoring game levels, according to one embodiment described herein. As shown, the method 900 begins at block 910, where the classifier training component 133 retrieves a set of game levels. For example, such game levels could have been generated manually by one or more game developers of the gaming application. The classifier training component 133 collects user gameplay data by monitoring user playthroughs of the set of game levels (block 915). For example, the gaming applications 180(1)-(N) on the client devices 160(1)-(N) could be configured to collect gameplay metrics describing user playthroughs of the set of game levels and to transmit such user gameplay data to the classifier training component 133. In the depicted embodiment, the classifier training component 133 receives user feedback for the set of game levels (block 920). For example, the gaming applications 180(1)-(N) on the client devices 160(1)-(N) could selectively prompt users to provide the user feedback, after the users have played through one of the game levels, and the gaming applications 180(1)-(N) could then transmit this user feedback information to the classifier training component 133.

The classifier training component 133 further collects automated level traversal data based on automated playthroughs of the set of game levels (block 925). For example, the automated level traversal component 128 could attempt to playthrough each of the game levels in the set of game levels multiple times, and the classifier training component 133 could collect data describing these automated playthrough attempts. Such data can include, without limitation, a failure rate of the automated playthroughs, an average completion time of successful automated playthroughs, an average number of gameplay actions performs during a successful automated playthrough, etc.

Additionally, the classifier training component 133 identifies a set of procedurally generated game levels (block 930). For example, such procedurally generated game levels could be the product of the procedural level generation component 120 and could represent the generated game levels having a determined quality score above a threshold level of quality. The classifier training component 133 collects additional user gameplay data from monitoring user playthroughs of the set of procedurally generated game levels (block 935). The classifier training component 133 further receives additional user feedback for the set of procedurally generated game levels (block 940). In one embodiment, the gaming applications 180(1)-(N) on the client devices 160(1)-(N) are configured to monitor the user playthroughs and could collect the user gameplay data describing user playthroughs of the set of procedurally generated game levels. Additionally, the gaming applications 180(1)-(N) could selectively prompt users for feedback on the procedurally generated game levels, after the users have played the procedurally generated game levels. The gaming applications 180(1)-(N) could transmit such user gameplay data and user feedback data to the classifier training component 133.

The classifier training component 133 also collects additional automated level traversal data, based on automated playthroughs of the set of procedurally generated game levels (block 945). For example, the automated level traversal component 128 could attempt to playthrough each of the game levels in the set of procedurally game levels, and the classifier training component 133 could collect data describing these automated playthrough attempts.

The classifier training component 133 can then provide the collected data for training a machine learning classifier (block 950), and the method 900 ends. In one embodiment, the classifier training component 133 is configured to train multiple machine learning classifiers 145 based on various aspects of the collected training data. For instance, the classifier training component 133 could train a first machine learning classifier to score game levels based on room volume, a second machine learning classifier to score game levels based on traversal prop placement within the game level, a third machine learning classifier to score game levels based on difficulty, and so on.

Figure 10:
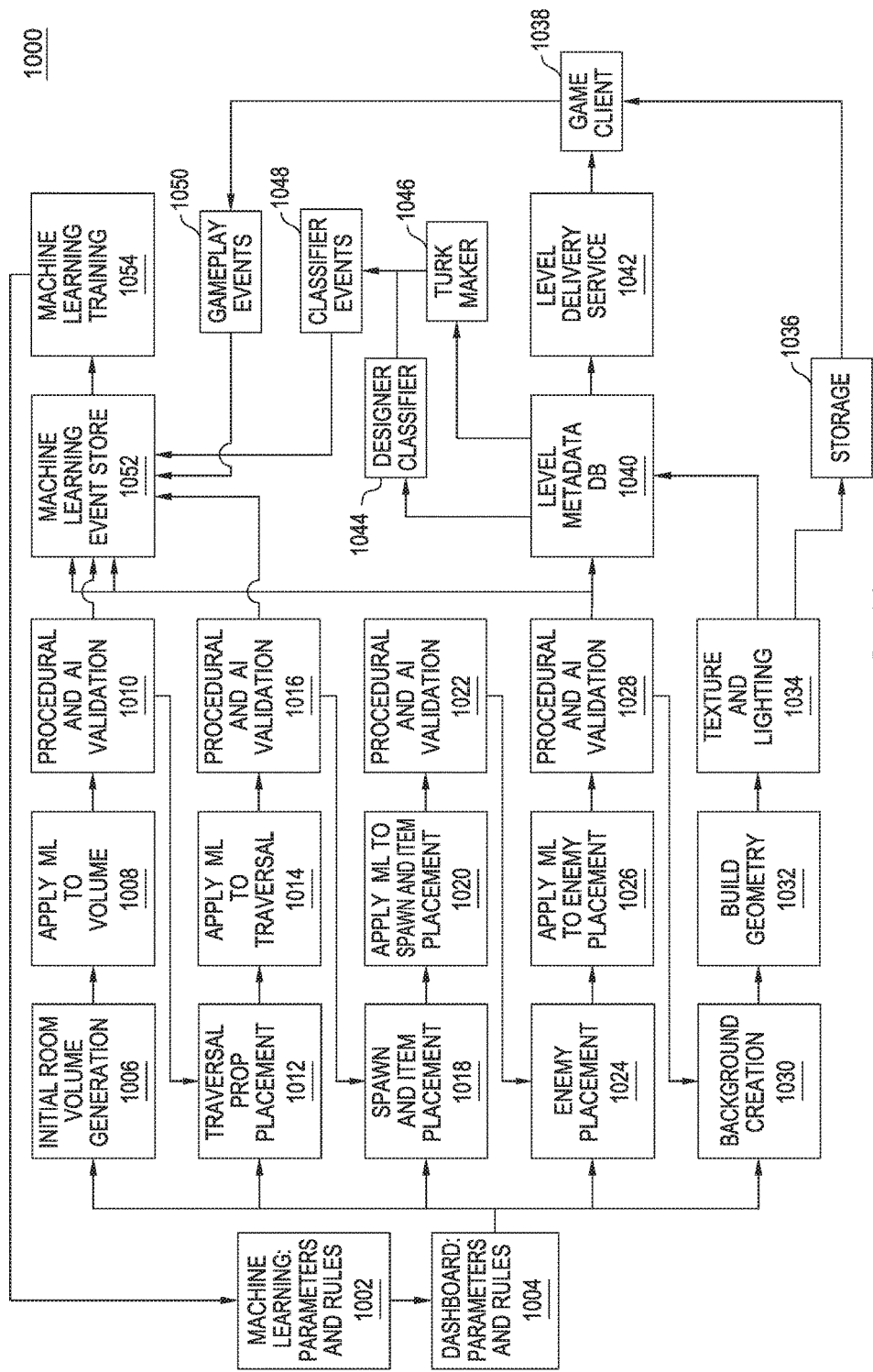
FIG. 10 is a workflow illustrating a process for generating and refining game levels, according to one embodiment described herein.

An example of such an embodiment is shown in FIG. 10, which is a workflow illustrating a process for generating and refining game levels, according to one embodiment described herein. As shown, the workflow 1000 includes a machine learning event store 1052 which, in one embodiment, represents the collected training data from multiple different sources (e.g., gameplay events 150 on game clients, classifier events 1048 from a service market 1046, various iterative game level generation stages 1010, 1016, 1022, and 1028, etc.). As discussed above, the classifier training component 133 can use the collected training data to train one or more machine learning classifiers 145, as shown at stage 1054.

In the depicted embodiment, the procedural level generation component 120 provides interfaces through which game developers can define parameters and other aspects of the level generation process. This is shown in the workflow 1000 as the machine learning: parameter and rules stage 1002 and the dashboard: parameters and rules stage 1004, where the game developers and other administrators can define various elements of the procedural level generation process (e.g., in a domain specific rule language) and level generation control parameters (e.g., adjustable via a dashboard interface).

Using these parameters, the procedural level generation component 120 in the depicted embodiment performs an iterative process for level generation. For instance, at a first iteration, the procedural level generation component 120 generates the initial room volume for a new game level (block 1006). The level analysis component 130 then uses one or more machine learning classifiers 145 to score the partially generated game level (block 1010). Additionally, the level analysis component 130 can perform procedural and artificial intelligence (AI)-based validation operations for the partially generated game level (block 1010). For example, the automated level traversal component 128 could attempt to playthrough the partially generated game level a set number of times and, based on these playthrough attempts, the level analysis component 130 could determine whether the partially generated game level contains any non-traversable areas, improper enemy or proper clustering, and so on. In one embodiment, the level analysis component 130 is configured to calculate a quality score for the partially generated game level, using the automated playthrough data as an input to a machine learning classifier 145, and the procedural level generation component 120 can refine the partially generated game level (as needed) until the quality score exceeds a threshold level of quality.

Similarly, the procedural level generation component 120 performs additional iterations of game level generation, where the procedural level generation component 120 performs traversal prop placement (block 1012), spawn and item placement (block 1018), and enemy placement (block 1024) for the game level. In the depicted embodiment, after each of these level generation stages, the level analysis component 130 classifies the partially completed game level using a respective machine learning classifier 145 (blocks 1014, 1020 and 1026) and performs further procedural and AI validation (blocks 1016, 1022, and 1028), refining the game level as needed to ensure a sufficiently high quality score for the game level.

Additionally, the procedural level generation component 120 generates the aesthetic attributes of the game level, generating the background of the game level (block 1030), building the geometry of the game level (block 1032) and applying texture and lighting effects to the game level (block 1034). In doing so, the procedural level generation component 120 can retrieve sample room backgrounds (e.g., provided by an artist) for a variety of room shapes and biomes. The procedural level generation component 120 could then analyze these backgrounds to determine focal points within the backgrounds, and the procedural level generation component 120 could create constraints between objects (e.g., how a virtual chair fits relative to a virtual table) for use in placing background elements.

Once the game level is completed, the completed game level can be saved to storage (e.g., a cloud computing storage system) at block 1036. The completed game level can then be provided to game clients (block 1038). Additionally, once the game level is generated, metadata describing the game level is transmitted to a game level metadata database (DB) at block 1040. Such metadata could include, for example, a unique identifier for the game level, the biome the game level is associated with, the sub-biome the game level is associated with, a determined difficulty of the game level, and more generally any data that is searchable when selecting levels for players. Such metadata can then be used by the level delivery service (block 1042) in selecting a game level to deliver to the game client 1038. Gameplay events 1050 coming from the game client 1038 can be fed back into the machine learning event store 1052, for use in further refining the machine learning classifiers 145.

Additionally, the generated game levels can be provided to users on a service market for detailed testing (block 1046), and the feedback from such testing, together with a quality score of the generated game levels by the designer classifier (block 1044), can provide further classifier events (block 1048) which can be fed back into the machine learning event store (block 1052). Such classifier events (block 1048) can then be used to further refine the machine learning classifiers 145.

FIGS. 11A and 11B are conceptual illustrations of example neural networks that can be used for classifying game levels. As shown in FIG. 11A, for each of multiple game level attribute data sets 1-N, a corresponding deep neural network (MN) is provided. For instance, DNN 1102A could correspond to a first game level attribute(s) and DNN 1102B could correspond to an Nth game level attribute(s). For example, the DNN 1102A could generate a quality score based on the room volume of the game level, while the DNN 1102B could generate a quality score based on the traversable props within the game level.

Each of the DNNs 1102A and 1102B include an input layer, one or more hidden layers, and an output layer. Each layer further includes one or more nodes. Nodes of a given layer connect to each node of a subsequent layer via directed connections. When input data (e.g., attributes of the game level, such as a room connection graph) for a given game level is received at an input layer, each node of the DNNs 1102A and 1102B may perform a computation and output a result to each node of a first hidden layer. Outputs may then be determined by each node of the first hidden layer and provided as input to nodes of a second hidden layer. The process may subsequently be repeated, layer by layer, until nodes of the output layer finally output values corresponding to the received input data for the game level. The level analysis component 130 could then compile the output values into a quality score for the game level.

FIG. 11B shows an example of a DNN, that includes multiple shared hidden layers of one or more nodes and game level attribute-specific output layers of nodes 1108A to 1108N corresponding to each of the game level attributes data sets 1-N. As discussed above, each game level attribute data sets 1-N can correspond to a distinct measurable attribute of a game level (e.g., a room connection graph representing the room volume of the game level, automated level traversal metrics collected by monitoring automated level traversal attempts of the game level, etc.). Note that although the nodes of the shared hidden layers of the DNN 306 are indicated as being shared between each of the sets of game level attribute data 1, 2 . . . N, this example is not meant to be limiting. As described above, the nodes of the multiple hidden layers of nodes may be shared between two or more of the game level attribute data sets 1-N.

In one example, when game level attribute data is received, the output layer of nodes 1108A may output values corresponding to a determined measure of quality, based on the received game level attribute data input data. Similarly, when input game level attribute data is received, the output layer of nodes 1108N may output values corresponding to the received game level attribute data. The output layers of nodes 1108A to 1108N may correspond to various measures of quality, based on differing sets of input game level attributes. The level analysis component 130 could then compile the output values into a quality score for the game level.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A method, comprising:
retrieving, from a memory device, a set of training data specifying, for each of a plurality of game levels for a gaming application, a respective plurality of values for a plurality of attributes of the game level and a respective plurality of quality scores for the game level;
training one or more machine learning models for the gaming application using the set of training data;
generating a plurality of game levels using a procedural level generator;
for each of the plurality of game levels:
determining, for the game level and by operation of one or more computer processors, a respective quality score, using the one or more machine learning models, comprising:
repeatedly attempting to traverse the generated game level, using an automated level traversal component, to collect automated level traversal data describing attributes of the repeated attempted traversals; and
providing the automated level traversal data as an input to a first one of the one or more machine learning models; and
determining whether the determined quality score for the game level exceeds a threshold score;
selecting one or more game levels having a determined quality score that exceeds the threshold score; and
transmitting the selected one or more game levels to at least one client of the gaming application.

2. The method of claim 1, further comprising:
determining, for a first one of the plurality of generated game levels, a first quality score, using the trained machine learning models; and
upon determining that the first quality score for the first generated game level that does not exceed the threshold score, preventing the first generated game level from being transmitted to the at least one client of the gaming application.

3. The method of claim 1, further comprising:
providing an Application Program Interface (API) through which remote clients can submit requests for generated game levels for the gaming application,
wherein transmitting the selected one or more generated game levels to the at least one client of the gaming application is performed further in response to receiving a request, from the at least one client, through the provided API.

4. The method of claim 1, wherein the plurality of attributes include at least one of (i) an indication of whether the game level is completable, (ii) an average completion time, (iii) a number of rooms within the game level, (iv) a number of enemies within the game level, (v) a number of items within the game level, (vi) a number of objectives within the game level, (vii) an average amount of backtracking in completing the game level and (viii) an average failure rate of the game level.

5. The method of claim 1, wherein determining, for the generated game level, the respective quality score, using the one or more machine learning models, further comprises:
determining a set of desired game level preferences associated with the at least one client of the gaming application, and
wherein determining, for the generated game level, the respective quality score is further based on the set of desired game level preferences.

6. The method of claim 1, wherein the set of training data comprises at least one of (i) user-submitted feedback specifying a quality score for the game level and (ii) user gameplay data collected by monitoring playthroughs of at least one of the plurality of game levels on one or more clients of the gaming application, and wherein at least one of the plurality of quality scores for the game level include a measure of popularity of the game level.

7. The method of claim 1, wherein the one or more machine learning models comprise one or more machine learning models, and wherein one or more quality scores determined using the one or more machine learning models represent an estimated likelihood the game level belongs to a class of quality game levels.

8. A system, comprising:
one or more computer processors; and
one or more memories containing a program which, when executed on the one or more computer processors, performs an operation comprising:
retrieving a plurality of machine learning models, each configured to score a game level for a gaming application based on a respective one of a plurality of attributes of the game level;
receiving a first game level for the gaming application;
determining a plurality of quality scores for the first game level using the plurality of machine learning models, wherein determining a first quality score of the plurality of quality scores further comprises:
repeatedly attempting to traverse the first game level, using an automated level traversal component, to collect automated level traversal data describing attributes of the repeated attempted traversals; and
providing the automated level traversal data as at least a portion of an input to at least one of the plurality of machine learning models; and
determining an aggregate quality score for the first game level for the gaming application, based on the determined plurality of quality scores.

9. The system of claim 8, the operation further comprising:
determining whether to make the first game level available to one or more clients of the gaming application, based on the determined aggregate quality score.

10. The system of claim 8, the operation further comprising:
providing an Application Program Interface (API) through which remote clients can submit requests for game levels for the gaming application;
receiving a request for game levels from a first client of the gaming application; and
upon determining that the aggregate quality score for the first game level exceeds a threshold level of quality, transmitting the first game level to the first client.

11. The system of claim 8, wherein at least one of the plurality of machine learning models was trained using a set of training data that includes at least one of (i) an indication of whether the game level is completable, (ii) an average completion time, (iii) a number of rooms within the game level, (iv) a number of enemies within the game level, (v) a number of items within the game level, (vi) a number of objectives within the game level, (vii) an average amount of backtracking in completing the game level and (viii) an average failure rate of the game level.

12. The system of claim 8, the operation further comprising:
training at least one of the plurality of machine learning models, using a set of training data collected from playthroughs of a plurality of game levels for the gaming application, wherein the set of training data comprises (i) user gameplay data collected by monitoring playthroughs of the game level on one or more clients of the gaming application and (ii) user-submitted feedback specifying a quality score for the game level.

13. The system of claim 8, wherein receiving the first game level for the gaming application further comprises generating the first game level using a procedural level generator.

14. A non-transitory computer-readable medium containing computer program code that, when executed by operation of one or more computer processors, performs an operation comprising:
retrieving a first machine learning model for scoring game levels for a gaming application, based on one or more attributes of the game levels;
retrieving a second machine learning model for scoring game levels for the gaming application, based on one or more attributes of automated playthrough attempts of the game levels;
generating a first game level using a procedural level generator;
repeatedly attempting to traverse the first game level, using an automated level traversal system, to collect automated level traversal data;
generating a first quality score for the first game level, by providing one or more attributes of the first game level as an input to the first machine learning model;
generating a second quality score for the first game level, by providing the automated level traversal data as an input to the second machine learning model; and
calculating an aggregate quality score for the game level, based on at least the first quality score and the second quality score.

15. The non-transitory computer-readable medium of claim 14, wherein the automated level traversal data includes at least one of (i) an indication of whether the first game level was completable by the automated level traversal system, (ii) an average completion time of the first game level by the automated level traversal system, (iii) an average amount of backtracking performed by the automated level traversal system in completing the game level and (iv) an average failure rate of the automated level traversal system in completing the game level.

16. The non-transitory computer-readable medium of claim 14, the operation further comprising:
upon determining that the aggregate quality score for the first game level exceeds a threshold level of quality, facilitating transmission of the first game level to at least one client of the gaming application.

17. The non-transitory computer-readable medium of claim 14, the operation further comprising:
based on at least one of the first quality score, the second quality score and the aggregate quality score, refining at least one aspect of the first game level.

18. The non-transitory computer-readable medium of claim 14, the operation further comprising training the first machine learning model for the gaming application, using a set of training data collected from playthroughs of a plurality of game levels for the gaming application, wherein the set of training data comprises (i) user gameplay data collected by monitoring playthroughs of the game level on one or more clients of the gaming application and (ii) user-submitted feedback specifying a quality score for the game level.

* * * * *